United States Patent [19]

Fraser et al.

[11] Patent Number: 5,049,907
[45] Date of Patent: Sep. 17, 1991

[54] CAMERA HAVING CHAMBER FOR STORING EXPOSED FILM UNITS DURING THEIR DEVELOPMENT

[75] Inventors: Richard J. Fraser, Franklin; Kenneth J. Launie, Cambridge; George D. Whiteside, Lexington, all of Mass.

[73] Assignee: Polaroid Corporation, Cambridge, Mass.

[21] Appl. No.: 610,803

[22] Filed: Nov. 8, 1990

[51] Int. Cl.⁵ .............................................. G03B 17/52
[52] U.S. Cl. ...................................................... 354/86
[58] Field of Search ......................................... 354/86

[56] References Cited

U.S. PATENT DOCUMENTS 3,426,664 2/1969 Norton .................................... 95/13
3,537,370 11/1970 Wareham ................................ 95/13
4,664,497 5/1987 Johnson et al. ....................... 354/86
4,839,676 6/1989 Lippert et al. ........................ 354/86

Primary Examiner—Michael L. Gellner
Attorney, Agent, or Firm—Alfred E. Corrigan

[57] ABSTRACT

An instant type camera having first and second film engaging means for moving an exposed film unit from a film cassette to a film storage chamber. The second film engaging means is mounted for movement from a position on the entry side of a pair of spread rollers to a position on an exit side of the spread rollers. During such movement, the second film engaging means engages a trailing edge of an exposed film unit as it emerges from between the spread rollers and moves it into the storage chamber.

10 Claims, 4 Drawing Sheets

CAMERA HAVING CHAMBER FOR STORING EXPOSED FILM UNITS DURING THEIR DEVELOPMENT

RELATED APPLICATION

This application is related to copending application Ser. No. 459,342, filed Dec. 29, 1989, entitled "EXTENDIBLE SHADE IN INSTANT CAMERA FOR PROTECTING FILM UNIT" by Richard J. Fraser et al., and assigned in common herewith.

FIELD OF THE INVENTION

This invention relates to apparatus for use with instant or self-developing type film units, and more particularly to a camera having an imbibition chamber for storing an exposed film unit during the formation of visible image therein.

BACKGROUND OF THE INVENTION

Attempts to decrease the volume of apparatus for use with instant type film, eg., cameras and camera backs, have been successful, in part, by providing the film units with a chemical opacification system for preventing further exposure of the film unit's emulsion or photosensitive layer by the ambient light during the formation of a visible image, thus obviating the need for a lighttight imbibition chamber in the apparatus. However, providing such apparatus with a lighttight imbibition chamber may provide one with benefits which offset, in part, any disadvantage caused by the space which it takes up. For example, removal of the opacification material, e.g., opacifying dyes, from the processing liquid of an instant type film unit would reduce the cost of the processing liquid. Further, the layer of processing liquid which is to be spread between the image receiving layer and the photosensitive layer could thereby be thinner thus improving resolution of the image and reducing the time required to produce a visible image.

The overall volume of instant type cameras having lighttight imbibition chambers may be minimized by moving the exposed film unit away from its cassette and then reversing its movement and directing it to an imbibition chamber located substantially under the cassette. A typical example of such a camera is described in U.S. Pat. No. 3,537,370. It includes a bulky pivotable container external of the camera housing to receive the exposed film unit after its exposure and just prior to its processing and this adds to the bulk of the camera.

A more recent development for storing film units behind the film cassette within the camera housing is illustrated in U.S. Pat. No. 4,664,497. It includes a lighttight imbibtion chamber in which an exposed film unit is adapted to remain until its latent image has been substantially transformed into a viewable image. The apparatus includes a housing enclosing a film chamber having structure for locating and supporting a film assemblage in position for the sequential exposure of a plurality of film units located therein. Located rearwardly or below the film assemblage supporting structure is a chamber which is adapted to receive an exposed film unit, subsequent to a processing liquid being spread across a layer thereof, and maintain it in a lighttight environment until the processing liquid has sufficiently imbibed the film unit for a period of time after which ambient light will not adversely affect the emerging visible image. The apparatus includes a battery operated motor mounted adjacent one end of the film assemblage supporting structure and means for advancing an exposed film unit from the assemblage's film cassette, around the motor and then to the lighttight imbibition chamber. The aforementioned advancing means includes a cantilevered member having a free end which is adapted to move an uppermost film unit from the film cassette; laterally spaced pairs of superposed friction wheels which are adapted to engage the lateral sides of the exposed film unit and continue its movement away from the film cassette and around the motor and toward a pair of cylindrically configured superposed rollers; the superposed rollers; and a second cantilevered member for advancing the exposed film unit into the lighttight imbibition chamber. The rollers are adapted to rupture a container of processing liquid carried on a leading end of the advancing film unit and spread its contents across a layer thereof to initiate the formation of a visible image therein by a diffusion process. As the exposed film unit leaves the bite of the rollers, its trailing end is located in a position to be engaged by the second cantilevered member for subsequent movement into the imbibition chamber. The apparatus further includes a loading door through which a film assemblage may be located on the aforementioned supporting structure. The loading door, which comprises one of the walls of the imbibition chamber, has a window therein through which the visible image in a film unit located within the imbibition chamber may be viewed without opening the loading door. Such window is ordinarily rendered lighttight by a blind which is movable from its operative position covering the window, to an inoperative position wherein the film unit within the chamber may be viewed. The blind is maintained in the operative position by a latch until the formation of a visible image within the last exposed unit to enter the imbibition chamber has been substantially formed. After the formation of the visible image, a timing circuit energizes a solenoid to move the latch to a position wherein the blind may be moved to its inoperative position. The imbibition chamber is also provided with a light sealed opening through which all of the film units located within the imbibition chamber may be moved as a unit to the exterior of the photographic apparatus. Suitable means, such as a manually actuatable slide, is provided for such purpose.

A problem with apparatus of the type described in the aforementioned '497 patent to B. Johnson et al. is that the momentum of the film unit as it exits from the bite of the spread rollers may not be sufficient to completely move the trailing end of the film unit from full and complete engagement with the spread rollers. Thus, when this happens, the trailing end of the film unit does not drop into a position wherein it may be engaged by the second cantilevered member for subsequent movement into the lighttight imbibition chamber.

SUMMARY OF THE INVENTION

The present invention relates to a self-developing or instant type photographic apparatus which incorporates many of the features of U.S. Pat. No. 4,664,497. Specifically, this invention comprises a camera having an imbibition chamber in which the exposed film unit is adapted to remain until its latent image has been substantially transformed into a viewable image. Operative components of the camera are encased within a housing having a top wall, side walls and a bottom wall. A window in the bottom wall is partially covered during the advancement of the film unit into the imbibition chamber. The chamber is not "lighttight" in the conventional sense, but the moving film unit is sufficiently shielded from ambient light, actinic to the exposed film unit, that it will not adversely effect the developing process.

A reciprocating shade or blind is mounted in the camera immediately adjacent the viewing window in the back of the camera. The shade is mechanically connected with a film unit advancing means which moves an exposed film unit from a film cassette after it has been exposed. Advancing of the exposed film unit from the cassette simultaneously closes the shade over a portion of the viewing window. The shade will not be retracted from the viewing window until after the exposed film unit has been passed through the film advancing system and been advanced into place in the imbibition chamber. The mechanical connections between the film advancing means and the reciprocating blind include means for engaging the trailing end of the exposed film unit as it passes through the bite of the spread rollers which rupture the developing liquid pod and spread the developing liquid in a conventional manner. After said means engages the trailing end of the film unit and advances it into place adjacent the viewing window, the blind is retracted to allow viewing through the window. The means for engaging the trailing end of the film unit is mounted for movement from a first position, wherein it is located on the entrance or downstream side of the spread rollers and out of the path of travel of the film unit, to a second position, on the exit or upstream side of the spread rollers. Thus, if the trailing end of the exposed film unit has not been fully propelled from the bite of the spread rollers, the film unit engaging means will engage and move the film unit during the former's movement from the first to the second position.

BRIEF DESCRIPTION OF THE DRAWINGS

For a fuller understanding of the nature and objects of the invention, reference should be had to the following detailed description taken in connection with the accompanying drawings wherein.

DESCRIPTION OF THE PREFERRED EMBODIMENT

Figure 1:
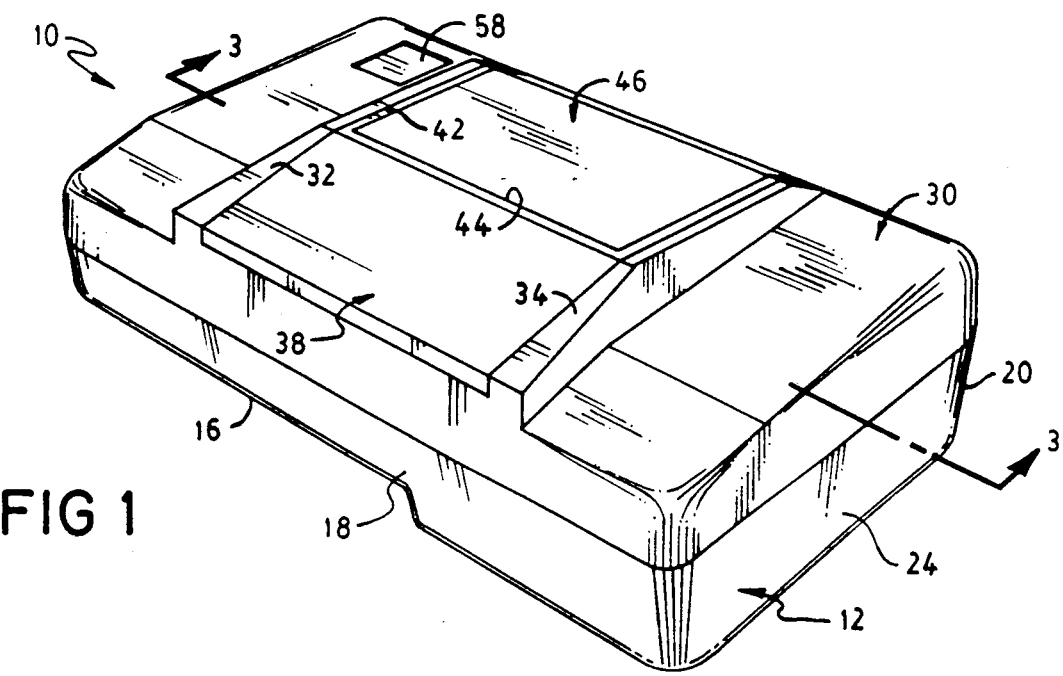
FIG. 1 is a perspective view of a folding instant type camera which incorporates the present invention, the camera being shown in a folded condition.

Reference is now made to the drawings wherein is shown photographic apparatus in the form of a folding camera 10 of the instant or self-developing type. The camera 10 includes a first or main housing 12 having a loading door 14 (FIG. 3) in a bottom wall 16 thereof. The first housing 12 also includes front and rear walls 18 and 20, respectively, and end walls 22 and 24. The door 14 is pivotally connected to the end wall 22 of the main housing 12 by a hinge (not shown) which is generally parallel with the axis of the camera's objective lens 28 and perpendicular to the forward and rear walls 18 and 20. The main housing 12 further includes a top wall 30 having a pair of spaced flanges 32 and 34 extending upwardly therefrom so as to define a recess 36.

Figure 2:
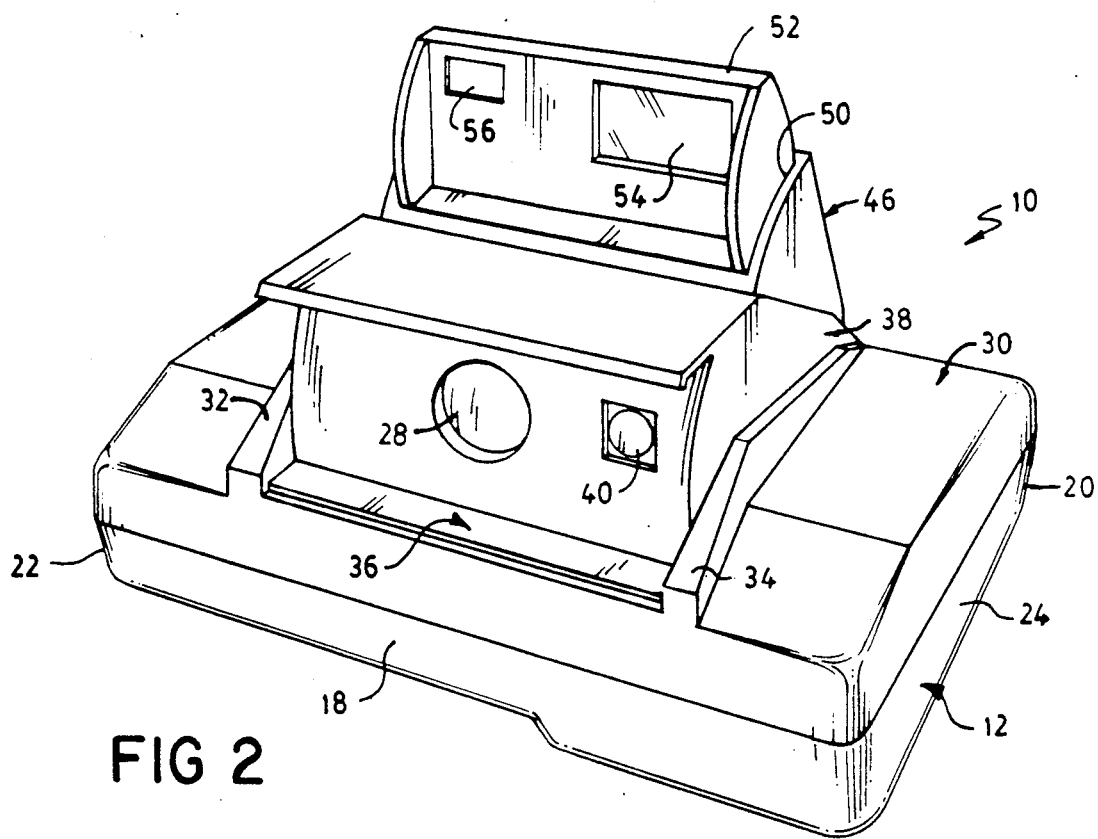
FIG. 2 is a perspective view showing the camera of FIG. 1 in an extended operative condition.

The camera 10 further includes a second housing 38 which is pivotally coupled to the first housing 12 about an axis (not shown) which is generally parallel with the rear wall 20 for movement between an inoperative position (see FIG. 1), wherein it is nested within the recess 36, and its operative position, as shown in FIG. 2. The second housing 38 supports the aforementioned objective lens 28, a shutter assembly, and a photocell window 40. A top wall 42 of the second housing includes a recess 44 which is adapted to receive a third housing 46 of the camera 10 when the camera is being collapsed or folded.

The third housing 46 is pivotally coupled to the rear wall 20 of the first housing 12 about a horizontal axis (not shown) which is generally parallel with the rear wall 20. The third housing 46 is provided with a recess 50 for pivotally receiving therein a fourth housing 52.

The fourth housing 52 supports a source or artificial illumination such as a strobe 54 and a ranging window 56. The fourth housing 52, as well as the second and third housings 38 and 46, is biased into the erect position shown in FIG. 2. Further, the fourth section 52 is adapted to be nested within the recess 50 prior to the third housing 46 being moved into the recess 44.

When the various housings are in the positions shown in FIG. 2, actuation of an exposure cycle initiation button 58 (see FIG. 1) located within a recess in the top wall 30 of the first housing 12 is effective to cause image bearing light rays to enter the camera 10 via the lens 28 and be reflected downwardly by a mirror (not shown) onto a film unit 62.

The camera 10 is adapted to receive a film assemblage of the type which includes a film cassette 60 having therein a stack of the film units 62 which is resiliently biased by a spring 64 toward a forward wall 66 of the cassette 60 so as to locate the uppermost film unit 62 adjacent to an exposure aperture 68 in the wall 66. The film units 62 are of the integral self-developing or instant type and include a rupturable pod 70 of processing liquid at their leading ends and a trap 72 at their trailing end for receiving any excess processing liquid, as is well known in the art. The camera 10 also includes a plate 74 for supporting the film cassette 60 in position for the sequential photographic exposure of the film units 62. The plate 74 includes a downwardly extending end section 76 and an upwardly standing flange 80 for engaging a trailing end wall 82 of the film cassette 60, thereby properly locating the film cassette 60 relative to the reflected optical axis of the objective lens 28.

The camera 10 also includes an imbibition chamber 84 which is defined in part by the loading door 14, the support plate 74, the end section 76 and the forward and rear walls 18 and 20 of the first housing 12. The imbibition chamber 84 provides an environment in which exposed film units 62 may be located during the period that the aforementioned processing liquid is being imbibed by one or more layers of the film unit 62. As the exposed film unit 62 enters the chamber 84, it is shielded from light which may be actinic to the exposed film unit as will be explained subsequently.

Exit of the film units 62 from the imbibition chamber 84 may be had by way of an egress opening formed in upstanding end wall of the loading door 14, such opening being closed by a door 86 which is pivotally mounted at 88.

Flanges 94 (best seen in FIG. 5) extend inwardly from sidewall members 90, 92 of the imbibition chamber 84 for supporting lateral sides of the exposed film units. A spring 96 (FIG. 3) is mounted on the supporting plate 74 for frictionally maintaining the exposed film units in place within chamber 84.

Subsequent to the exposure of a film unit 62, a motor 100 is energized to drive a first film engaging member 102 in a reciprocating manner to engage the exposed film unit by its trailing edge and advance it to the exterior of the film cassette 60 via an exit opening 104 formed in a leading end wall 78 of the cassette 60. As the exposed film unit 62 emerges from the film cassette 60, it enters the bite of laterally spaced pairs (only one pair being shown) of motor driven friction wheels 106 and 108. The wheels 106 and 108 engage lateral sides of the exposed film unit at areas outside its picture area, and outside of the ends of the processing liquid container 70. The two pairs of friction wheels 106 and 108 continue the movement of the exposed film unit 62 until its leading end is located in the bite of a pair of motor driven rollers 110 and 112 having a length at least equal to the width of the exposed film unit 62. During such movement, the leading end of the exposed film unit 62 engages a curved plate 118 which guides the exposed film unit 62 around the motor 100 and its support 116 and directs it into the bite of the rollers 110 and 112. The film engaging member 102, the pairs of friction wheels 106 and 108 and the spread rollers 110 and 112 together define a first film advancing means. Just prior to entering the bite of the rollers 110 and 112, the exposed film unit 62 moves between a pivotally mounted pressure plate 111 and a spread control surface 113 on the film cassette 60.

The rollers 110 and 112 continue the uninterrupted movement of the exposed film unit 62 toward the imbibition chamber 84 while simultaneously rupturing the container 70 of processing liquid and spreading its contents between layers of the film unit 62 to initiate the formation of a visible image within the film unit via a diffusion transfer process. As the processing liquid is expressed from its container 70, it defines a wave of liquid whose configuration is influenced by a damming effect caused by the cooperation between the pressure plate 111 and the spread control surface 113. For example, the thickness of the layer of processing liquid being spread by the rollers 110 and 112 may be controlled by moving an adjustable stop pin 115 toward or away from the pressure plate 111.

Film engaging member 102, when actuated, is mechanically connected to or engageable with a bracket 119 (best seen in FIG. 5) which is urged thereby to the right, simultaneously with member 102, to engage a lug 120 of a second film advancing means 125 which becomes operative to continue the movement of a film unit after the exposed film unit emerges from the spread rollers 110, 112, as will be explained subsequently.

As the exposed film unit 62 emerges from the rollers 110, 112 its leading edge engages a film deflector plate 121 which deflects the film unit between the underside of the trailing end of a previously exposed film unit 62 located in the imbibition chamber 84 and on top of the rails or flanges 94.

Figure 3:
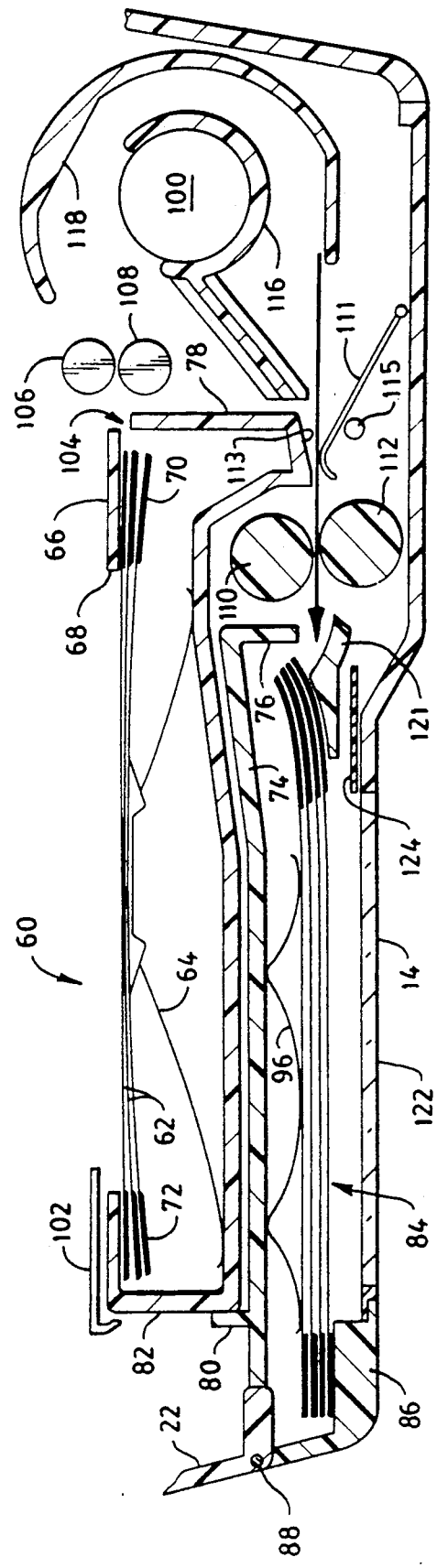
FIG. 3 is an enlarged cross-sectional view, partly in section, of the camera, taken generally along the line 3—3 of FIG. 1, the upper portion of the camera being omitted for reasons of clarity.
Figure 4:
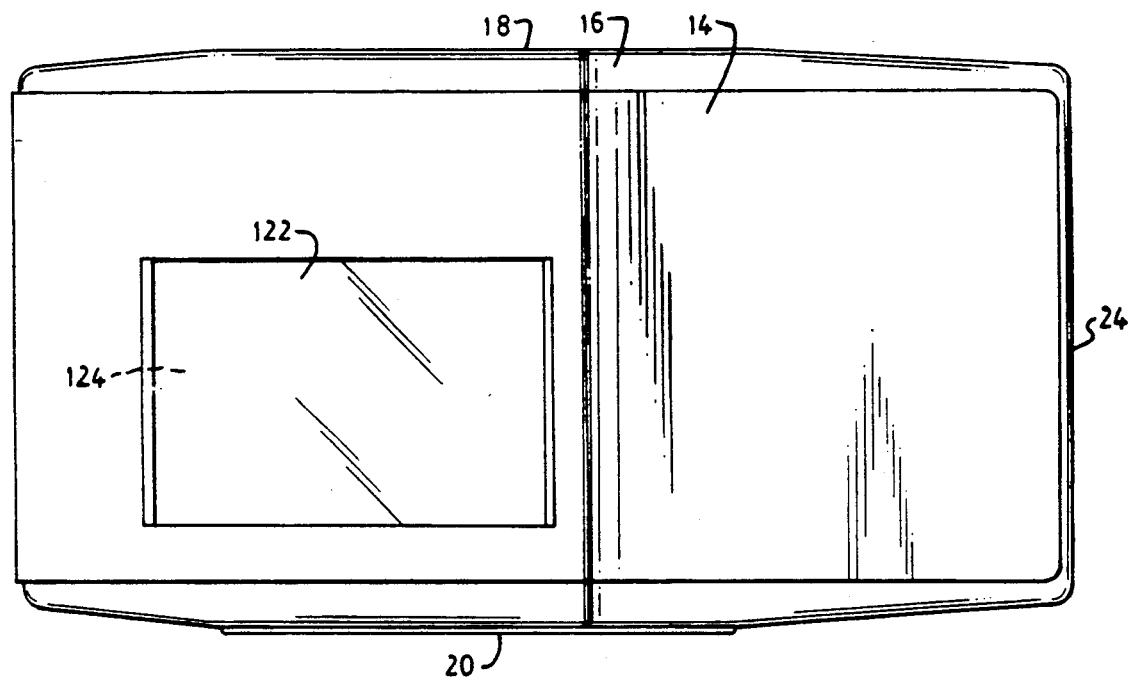
FIG. 4 is a bottom view of the camera of FIG. 1.
Figure 5:
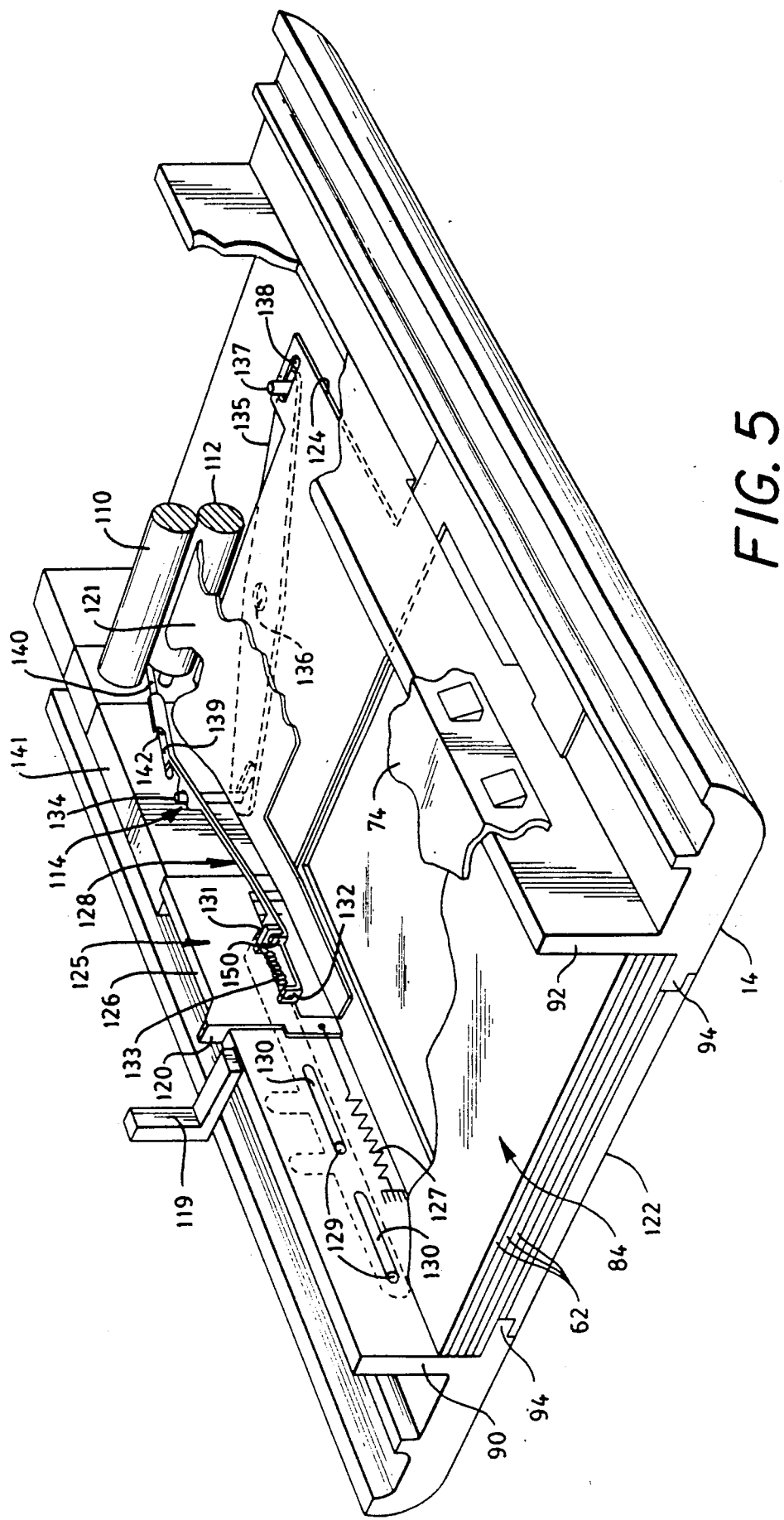
FIG. 5 is a perspective, fragmentary view of the bottom wall of the camera of FIG. 1 and associated parts.

At the time the film unit 62 engages the deflector plate 121 and is directed into place on the rails 94, the viewing window is partially covered by an opaque blind 124. Blind 124 is moved into light blocking position over about ¼ to ⅓ of a viewing window 122 at the time the film unit is advancing from the film cassette 60 through the opening 104 and into the bite of the pairs of rollers 106 and 108. During movement of the film advancing member 102 to the right, as seen in FIG. 3, the mechanical connection schematically represented by the bracket 119 also moves to the right as illustrated in FIG. 5. Movement of the bracket 119 is effective to move the second film advancing means 125 to the right. Note that the second film advancing means 125 is comprised of several parts. The first part is a panel-shaped element 126 approximately parallel with the sidewall 90. The panel 126 is biased to the left, as seen in FIG. 5, by a spring 127.

Panel 126 straddles an elongated connection member 128. The elongated connection member 128 is mounted to reciprocate in a plane which is parallel with the wall 90. Pins 129 projecting laterally of the member 128 extend into guide slots 130 in the wall 90. The shape of the elongated connection member 128 outside the imbibition chamber 84 is hidden by the wall 90 as seen in FIG. 5 and is shown therein in broken lines.

Movement of the bracket 119 to the right engages the lug 120 (which extends across the top of the wall 90) and drives the panel 126 to the right. An inwardly projecting flange 131 extending into the chamber 84 from the panel 126 is connected to a flange 132 on the elongated connection member 128 by a spring 133 and in combination they urge the elongated connection member 128 to the right when the first engaging member 102 moves to the right.

A slot 114 in the member 128 engages a first upstanding stud 134 which is secured to one end of a lever arm 135 (seen primarily in broken lines in FIG. 5). The lever arm 135 is pivoted at 136 and upon the movement of the first stud 134 to the right, the lever arm 135 will rotate clockwise to drive a second upstanding stud 137 at its opposite end to the left. The second stud 137 projects upwardly from the lever arm 135 through a slot 138 in the blind 124, which slot 138 allows transverse reciprocation as the second stud 137 drives the blind 124 to the left to cover a portion of the viewing window 122.

Simultaneously with the clockwise rotation of the lever arm 135, movement to the right by the elongated connection member 128 is guided by an integral flange 139 riding in a slot 140 in a side of a wall 141. Note that the spreading roller 112 is shorter in length than the roller 110 at the end adjacent the wall 141. This provides a passageway which allows the end of the elongated member 128 incorporating the flange 139 and an upstanding lug 142 to slide past or between the rollers and be guided downwardly to a position on the entrance or downstream side of the spread rollers 110 and 112 where it is located behind and below the roller 110.

Movement of the second film advancing means 125 to the right terminates when the film engaging end or lug 142 of the elongated member 128 is located on the entry side of the spread rollers 110, 112 at a position wherein it is located below the path of travel of an exposed film unit as the latter is about to enter the bite between the spread rollers 110 and 112. Movement of the shade 124 partially across the viewing window 122 enables a processing liquid to be spread between layers of the exposed film unit as it progresses into the chamber 84 through a distance sufficiently long enough that when its leading end (pod end) eventually moves out of superposition with the left end of the shade 124 the ambient light which strikes it cannot be "piped" along the length of the film unit to an area located on the entrance side of the spread rollers where it could fog untreated portions of the film unit's photosensitive layer. Developer liquid in pod 70 includes an amount of shielding or light dissipating chemicals to prevent further exposure of the film unit's photosensitive layer while moving between the spread rollers 110 and 112 and the chamber 84. This feature in combination with partial shielding by the blind 124 prevents light actinic to an exposed film unit from reaching a susceptible portion of the developing film unit. Movement of the shade 124 partially across the viewing window 122 in effect increases the time that the processing liquid, including its chemical opacifying constituents, has to imbibe layers of the film unit to protect its photosensitive layer from the ambient light when the film unit eventually moves out of superposition with the shade 124. It, the shade, also effectively increases the length of the film unit's outer transparent layer or support that is located on the exit or upstream side of the rollers 110 and 112 before its leading end moves out of superposition with the shade 124. This transparent layer is known to pipe light and thus is provided with its own internal light opacification system, e.g., carbon black, dispersed throughout its layer in a manner which does not adversely interfere with the photographic exposure of its underlying photosensitive layer, but does interfere with the piping of ambient light along its length. It is believed that the energy of such light can be reduced by said carbon black to a level whereat it is no longer actinic to the underlying photosensitive layer. This can be done by 1) increasing the amount or density of carbon black in the transparent layer or 2) by maintaining a minimum density of carbon black and increasing the length of the transparent layer located on the exit side of the spread rollers before its leading edge is struck by ambient light entering the chamber 84 via the window 122. The latter is preferred if for no other reason than the first alternative would adversely affect the photographic exposure of the underlying photosensitive layer. Thus, in the latter case of extending the length, it is believed that as the ambient light is continually interfered with (collisions) as it "pipes" its way along the length of the transparent layer, its energy level is continuously reduced until it reaches a point below the actinic level by the time that it reaches a location where the underlying photosensitive layer has not been protected by a coating of the processing liquid.

As the exposed film unit emerges from the annular chute between the motor support 116 and the plate 118, its leading edge, which contains the rupturable container 70 of processing liquid, passes through the bite of the motor driven spread rollers 110, 112 without engaging the lug 142 on the member 128.

As the leading edge of the film unit emerges from the exit side of the spread rollers, it is guided upwardly by the film deflector 121 thereby permitting the emerging film unit to be located closest to the window 122 in the bottom wall 14 of the camera. As the trailing end of the film unit emerges from the bite of the spread rollers, means (not shown) are energized to permit movement of the film advancing means 102 to the left back into its original position. This latter movement is effective to permit the bracket 119 to be moved to the left as the spring 127 retracts the second film advancing means 125 to the left. Movement of panel 126 to the left is effective, via the engagement between its flange 131 and an upstanding flange 150 on the elongated connection member 128, to move the film engaging lug 142, or second film engaging means, into engagement with the trailing end of the exposed film unit and complete its movement into the imbibition chamber 84 where it may be viewed through window 122.

Movement of elongated member 128 to the left pulls the first stud 134 to the left and rotates the lever arm 135 in a counterclockwise direction thereby allowing the second stud 137 to pull the shade 124 from its position overlying the viewing window 122.

Film units located within the storage chamber 84 may be removed therefrom for viewing by merely pivoting the door 86 located in the left end of the camera, as seen in FIG. 3, and then removing the film units for inspection. The film units may thereafter be returned to the film chamber 84 if desired.

The elongated member 128 is somewhat delicate in structure and simultaneous movement of the elongated member 128 and the panel 126 to the right is avoided by the spring connection 133 when the member 128 meets a resistance. This serves as a protection for the elongated member 128 in that the spring 133 will expand as the panel 126 moves to the right in response to the connection member 119 without corresponding movement and possible bending of the elongated member 128.

After all of the film units 62 have been exposed, developed and moved to the imbibition chamber 84, the empty film cassette 60 may be removed by unlatching and pivoting the loading door 14 in a clockwise manner about its hinge (not shown). As the loading door 14 is pivoted toward its open position, it carries therewith among other elements, the spread rollers 110 and 112, the support plate 74 carrying the film cassette 60, the second film advancing means 125 and the shade 124 thereby providing easy access to the fixed structure such as the friction rollers 106 and 108 and the annular chute between elements 110 and 118.

Since certain changes may be made in the above described apparatus without departing from the scope of the invention herein involved, it is intended that all matter contained in the above description or shown in the accompanying drawings shall be interpreted as illustrative and not in a limiting sense.

What is claimed is:
1. Photographic apparatus comprising:
   means for supporting a film cassette containing a plurality of instant type film units in position for their sequential exposure;
   means for defining an imbibition chamber, said means including a window through which an image in an exposed film unit may be viewed subsequent to its formation;
   first means for advancing a film unit, subsequent to its exposure, toward said imbibition chamber, said first advancing means including a first film engaging means for moving an exposed film unit from the film cassette and means for spreading a processing liquid across a layer of the exposed film unit so as to initiate the formation of a visible image therein; and
   second means for advancing the exposed film unit from said spreading means to said imbibition chamber, said second advancing means including a second film engaging means mounted for movement from a first position, wherein it is located on an inboard side of said spreading means and out of a path of travel of the exposed film unit as it approaches said spreading means, toward a second position, where it is located on an exit side of said spreading means while simultaneously engaging a trailing end of the exposed film unit and advancing it into said imbibition chamber.

2. Photographic apparatus as defined in claim 1 wherein said spreading means includes a pair of juxtaposed rollers at least one of which includes means for defining a passageway to permit the movement of said second film engaging means between said first and second positions.

3. Photographic apparatus as defined in claim 2 further including means for coupling said second advancing means to said first film engaging means for simultaneous movement.

4. Photographic apparatus as defined in claim 3 including means for allowing relative motion between said first and second film engaging means whereby damage to either of said first or second film engaging means is prevented should said second film engaging means be prevented from moving from said second position to said first position.

5. Photographic apparatus as defined in claim 4 wherein said means for allowing relative motion includes means for resiliently coupling said second film engaging means to an adjacent part of said second advancing means.

6. Photographic apparatus as defined in claim 3 further including a shade mounted for movement between an inoperative position out of covering relation with said window and an operative position in covering relation with a portion of said window, and means for connecting said shade to said second advancing means for movement of said shade into said operative position as said second film engaging means moves into said first position.

7. Photographic apparatus as defined in claim 6 wherein said connecting means moves said shade out of said operative and into said inoperative position as said second film engaging means moves into said second position.

8. The apparatus of claim 7 wherein said connecting means includes a lever having one end drivingly coupled to said second film engaging means, and a second end coupled to said shade.

9. The apparatus as defined in claim 8 wherein said imbibition chamber includes a loading door having said window mounted therein, said loading door including a major surface located in a plane which is substantially parallel with and located rearwardly from a plane in which a film unit is to be located during its exposure.

10. The apparatus as defined in claim 2 further including means for guiding each exposed film unit, as it initially enters said imbibition chamber, to a position between said shade and any film unit located therein, thereby placing the last film unit to enter said imbibition chamber in position to be viewed through said window.

* * * * *